United States Patent [19]
Christensen

[11] 3,962,815
[45] June 15, 1976

[54] STORAGE CONTAINER FOR SPOOLS OF FISHING LINE

[76] Inventor: Peter Christensen, 460 Sandhill Road, Wantagh, N.Y. 11793

[22] Filed: Feb. 7, 1975

[21] Appl. No.: 547,802

[52] U.S. Cl. ........................... 43/54.5 R; 242/137.1
[51] Int. Cl.². ......................................... A01K 97/00
[58] Field of Search ....... 43/54.5 R, 54.5 A, 57.5 R; 242/137, 137.1, 129.6, 138; 206/394, 409

[56] References Cited
UNITED STATES PATENTS

| | | | |
|---|---|---|---|
| 434,047 | 8/1890 | Jones | 242/137 |
| 1,474,580 | 11/1923 | Clark et al. | 242/137.1 |

FOREIGN PATENTS OR APPLICATIONS

| | | | |
|---|---|---|---|
| 1,260,160 | 3/1961 | France | 242/137.1 |

Primary Examiner—Warner H. Camp
Attorney, Agent, or Firm—Bauer, Amer & King

[57] ABSTRACT

A box-like container for storing spools of fishing line, in which replacement fishing line is readily unwound in a selected length through a cooperating dispensing opening in the container wall. Unwinding rotation of the spool is achieved by journalling the spool on an axle mounted centrally across the storage compartment of the container. One end support for the axle is a closure member which is force fit over a side access opening into the storage compartment, said force fit being established with a portion of the container wall extending beyond the end member and, as such, functioning as a gripping lip.

1 Claim, 3 Drawing Figures

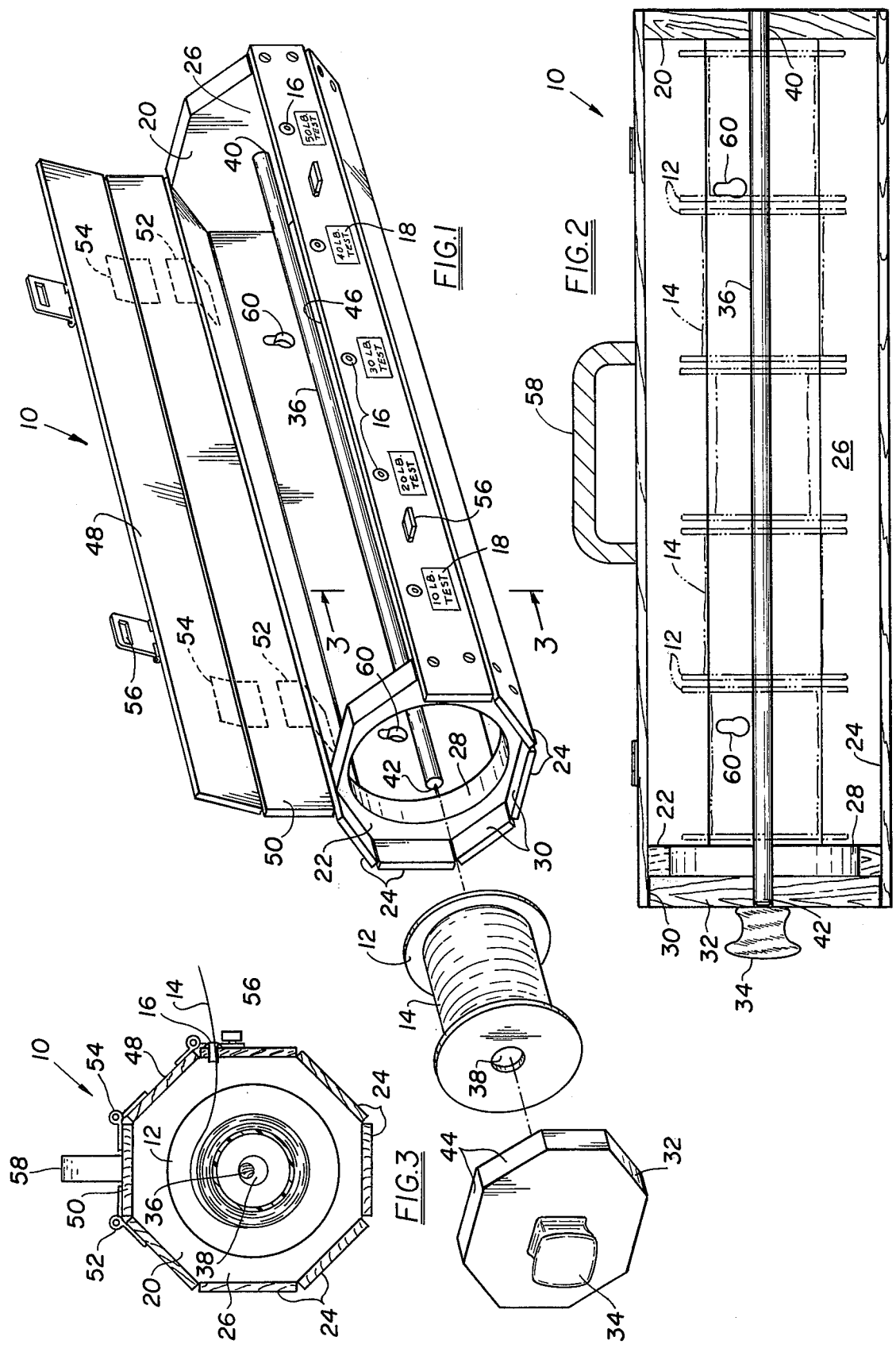

STORAGE CONTAINER FOR SPOOLS OF FISHING LINE

The present invention relates generally to accessory fishing equipment, and more particularly to an improved fishing line storage box or container.

Underlying the present invention is the recognition of the need for a storage receptacle for fishing line which, in addition to serving this end use, also facilitates the dispensing of the fishing line. Often the fishing line in use is broken by the fish, or due to snagging of the lure, or other such cause. Replacement of the fishing line is complicated by location of the parties and equipment on shipboard, and thus in confined quarters, as well as the tendency of the replacement fishing line to entangle with other line, or to snag on objects or the like. Aside even from emergency situations, the line might require change periodically because of age, a new reel, or the like. The conventional storage box, such as is used for the storage of hooks, sinkers, and other fishing paraphernalia, is also commonly used for storage of supply spools of fishing line, and is of little assistance in replacing the fishing line on the fishing pole or other fishing apparatus.

Broadly, it is an object of the present invention to provide an improved storage container for fishing line overcoming the foregoing and other shortcomings of the prior art. Specifically, it is an object to provide a container for effectively placing plural fishing line spools in storage condition, i.e. for use only when needed, and, when needed, having the same in condition to be readily dispensed from the container without opening the container, removing the spool therefrom, or otherwise significantly disturbing storage service of the container.

A fishing line storage container demonstrating objects and advantages of the present invention includes a box-like member formed by a first and a second end member disposed in spaced apart facing relation. A cooperating arrangement of walls are disposed in spanning relation between the end members so as to bound an internal storage compartment. The first end member is made with an access opening into the storage compartment of a size to permit the placement of spools of fishing line into, and their removal from, the storage compartment. Also, the walls are sized to extend beyond the first end member so as to form a closure-gripping lip about the access opening. A closure member is force fit against this lip in its closed position over the access opening. Completing the container is a spool-supporting axle connected in a central location across the storage compartment in spanning relation between the closure member and the second end member, said axle having its opposite ends projected into openings in the closure member and the second end member. Use of the container contemplates unwinding select lengths of fishing line from supply spools thereof supported on the axle within the storage compartment and drawing the same through dispensing openings in the container wall associated with each spool.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a perspective view of the container, in which parts thereof are shown in exploded perspective to better illustrate how the fishing line spools are placed in their operating positions;

FIG. 2 is a top plan view of the container, as viewed through the opening thereof into its storage compartment, in which the spools are shown in phantom perspective; and FIG. 3 is a side elevational view, in section taken on line 3—3 of FIG. 1.

Reference is now made to the drawings wherein there is shown a storage container, generally designated 10, for fishing line put up in supply spools, individually and collectively designated 12. Since the spools 12 are generally cylindrically shaped, container 10 preferably is of an octagonal shape so that it closely conforms to the shapes of the spools 12, i.e. has a minimum of unused clearance space about the spools, and yet, by virtue of the octagonal shape there are flat sides to minimize inadvertent rolling or other movement of the container 10 during its shipboard use. While the octagonal shape is preferred, it will be understood that the invention is not limited to this specific shape.

As will be described in greater detail subsequently, container 10 is advantageously used for storing supply spools 12 of fishing line 14. When the fishing line in use is broken by the fish, or possibly even due to snagging of the lure, or other such cause, it is of course necessary to replace the fishing line. In this respect container 10 is a noteworthy convenience product wherein it permits the replacement fishing line 14 to be readily unwound from the supply spool 12 in any selected length for replacement on the fishing pole or other fishing apparatus. Specifically, during the unwinding of the selected length of replacement fishing line 14 the possibility of its tangling with other fishing line or snagging other fishing equipment is minimized. Further, it is contemplated that container 10 will function as the storage receptacle for a number of spools 12 of fishing line, each of a different size or "test weight". Since the replacement fishing line 14 is withdrawn from container 10 through a selected one of a number of dispensing openings 16, the size or test weight identification of said fishing line is conveniently displayed, as at 18, adjacent its cooperating dispensing opening 16.

In a preferred embodiment, container 10 includes two end members 20 and 22, each of an octagonal shape as illustrated. Appropriately connected in spanning relation between the end members 20, 22 are slats or body members, individually and collectively designated 24, which cooperate and function as walls bounding the internal storage compartment 26 for the container 10.

End member 22 is formed with a centrally located opening 28 to provide access to the compartment 26, opening 28 being of a sufficient size to allow the placement of spools 12 within the compartment 26 and also their removal therefrom. Also to be noted in connection with end member 22 is that the slats 24 are of a size so that they extend beyond end member 22 and thereby provide a closure-gripping lip 30 about the access opening 28. Stated somewhat differently, the selection of the location for the connection between the walls 24 and member 22 is chosen so as to result in a lip 30 which extends slightly beyond the member 22, all as is clearly illustrated.

Functioning as an axle support and also a closure member for the access opening 28 is an octagonal member 32, the same being of a size to provide a friction fit when inserted in the compartment bounded by the lip 30. For convenience in placing the closure member 32 in its closed position over the opening 28 and removing it therefrom, member 32 is provided with a hand grip 34.

Spools 12 are supported in the storage compartment 26 in position adjacent a cooperating dispensing opening 16 on a transversely oriented axle 36 which is of a diameter appropriate to be projected through the central opening 38 of the spools 12. The operative position of axle 36 is one in which it is connected in a central location across the storage compartment 26 in spanning relation between the end member 20 and the closure member 32, said members 20 and 32 each having a centrally located opening 40 into which the opposite ends of the axle 36 are projected, and consequently provide the supported position for the axle 36.

To place the spools 12 in a storage position journalled on the axle 36 within the storage compartment 26 it is necessary merely to remove the closure member 32. This of course exposes end 42 of axle 36. The other end of the axle 36 will be assumed to be within its projected and supported position within opening 40 of end member 20. The spools 12 are then placed, one at a time, on the axle 36 and moved to their storage position within the storage compartment 26. Next, closure member 32 is moved into its operative closed position over the access opening 28 during which the axle end 42 is inserted within the opening 40 of member 32. During this closing movement of member 32 its peripheral edge 44 achieves a force fit with the internal surface of lip 30. As a consequence, closure member 32 is held in its position supporting the axle 36.

To assist in initially threading the fishing line on the spools 12 through their cooperating dispensing openings 16, and also to check from time to time on the quantity of fishing line available on the various spools 12, there is a need for another access opening into the storage compartment 26. This access opening, designated 46, is provided by mounting two of the body slats or walls 48 and 50 for pivotal movement relative to the stationary slats or walls 24. Preferably, this pivotal movement is provided by hinging wall slat 50 to the container body with hinges 52, and then hinging body slat 48 to a slat 50 using hinges 54.

Normally, opening 46 is closed by slats 48, 50 and held in a closed position by suitable connecting means, such as the turnbuckle means 56 or the like. Completing the construction of the container 10 is a hand grip 58 which contributes to the convenience in carrying and transporting the container. In some instances it might be desirable to mount container 10 on a support wall or panel and so apertures 60 are made available to receive hooks or the like as may be necessary to complete the mounting of container 10 to the support.

From the foregoing it should be readily appreciated that there has been described herein a useful and noteworthy storage box or container for fishing line which, in addition to storage of the line, also greatly facilitates dispensing of the line when needed, in whatever selected size, and in any selected length from a suitable supply thereof.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A storage container for plural cylindrically shaped spools of fishing line comprising a first and a second end member disposed in spaced apart facing relation, a cooperating arrangement of eight slats circumferentially disposed in spanning relation between said end members so as to bound an internal storage compartment of an octagonal shape so as to closely conform to the cylindrical shape of the spools while minimizing rolling of said container during shipboard use, said first end member having an access opening into said storage compartment of a size to permit the placement of spools of fishing line into, and their removal, from, said storage compartment, all of said slats being sized to extend beyond said first end member so as to form an octagonal-shaped closure-gripping lip about said access opening, a closure member adapted to be force fit within said lip in its closed position over said access opening, an adjacent pair of said slats being hinged to each other and also hinged for opening and closing movements relative to the other slats so as to provide a second access opening into said storage compartment, a spool-supporting axle connected in a central location across said storage compartment in spanning relation between said closure member and said second end member by having its opposite ends projected into openings in said closure member and said second end member, and dispensing openings at spaced locations in one said slat for unwinding select lengths of fishing line from supply spools thereof supported on said axle within said storage compartment.

* * * * *